United States Patent
Xiao

(10) Patent No.: US 11,955,893 B2
(45) Date of Patent: Apr. 9, 2024

(54) SWITCHING POWER SUPPLY, POWER ADAPTER AND CHARGER

(71) Applicant: SHENZHEN HUNTKEY ELECTRIC CO., LTD., Guangdong (CN)

(72) Inventor: Minli Xiao, Guangdong (CN)

(73) Assignee: SHENZHEN HUNTKEY ELECTRIC CO., LTD., Shenzhen (CN)

( * ) Notice: Subject to any disclaimer, the term of this patent is extended or adjusted under 35 U.S.C. 154(b) by 296 days.

(21) Appl. No.: 17/607,026

(22) PCT Filed: Mar. 15, 2021

(86) PCT No.: PCT/CN2021/080861
§ 371 (c)(1),
(2) Date: Oct. 27, 2021

(87) PCT Pub. No.: WO2021/185213
PCT Pub. Date: Sep. 23, 2021

(65) Prior Publication Data
US 2022/0216796 A1    Jul. 7, 2022

(30) Foreign Application Priority Data
Mar. 18, 2020 (CN) .......................... 202010193533.1

(51) Int. Cl.
H02M 3/335    (2006.01)
H02M 1/00    (2006.01)

(52) U.S. Cl.
CPC ..... H02M 3/33507 (2013.01); H02M 1/0032 (2021.05)

(58) Field of Classification Search
CPC . H02M 3/33507; H02M 1/0032; H02M 3/335
See application file for complete search history.

(56) References Cited

U.S. PATENT DOCUMENTS

| 2009/0284994 A1* | 11/2009 | Lin | .................... H02M 3/33507 363/21.13 |
| 2010/0208394 A1* | 8/2010 | Lin | .......................... H02M 1/32 361/18 |

(Continued)

FOREIGN PATENT DOCUMENTS

| CN | 1520016 A | 8/2004 |
| CN | 101783595 A | 7/2010 |
| CN | 101783595 B | 12/2012 |

OTHER PUBLICATIONS

International Search Report of PCT Patent Application No. PCT/CN2021/080861 dated May 27, 2021.

*Primary Examiner* — Alex Torres-Rivera

(57) ABSTRACT

A switching power supply, a power adapter and a charger are provided. The switching power supply comprises a current-mode PWM control unit, a transformer, and a DC power supply circuit connected in series to a power compensation auxiliary circuit. The current-mode PWM control unit comprises a current detection terminal. An input of the DC power supply circuit is connected to an auxiliary voltage output. The auxiliary voltage output outputs an auxiliary voltage related to output voltage of the switching power supply. The power compensation auxiliary circuit is used to compare the output voltage and a threshold voltage. When the current output voltage of the switching power supply is not greater than the threshold voltage, the power compensation auxiliary circuit generates a DC voltage, thus providing a compensation voltage to the current detection terminal, otherwise no compensation voltage is provided.

15 Claims, 9 Drawing Sheets

(56) References Cited

U.S. PATENT DOCUMENTS

2011/0019445 A1* 1/2011 Wu ................... H02M 3/33507
363/78
2021/0013809 A1* 1/2021 Chen ................... H02M 3/3385

* cited by examiner

SWITCHING POWER SUPPLY, POWER ADAPTER AND CHARGER

FIELD OF THE INVENTION

The invention relates to the field of power supply, in particular to a switching power supply, a power adapter and a charger.

BACKGROUND OF THE INVENTION

Switching power supplies with transformers are widely used in electronic products, such as power adapters or chargers. In some cases, when the load of the switching power supply is overloaded or short-circuited, the output current of the switching power supply may exceed the rated range, which may cause a safety hazard.

To address the above safety issues, the International Electrotechnical Commission (IEC) has specified the Limited Power Supply (LPS) requirements that needs to be met. For example, for a certain type of power supply, the output open-circuit voltage should not exceed 30Vdc, the maximum output short-circuit current should not exceed 8 A, and the maximum output power should not exceed 100 VA.

In the prior art, there are typically several ways to meet the LPS requirements, or to address the safety issues associated with the LPS testing scenario.

(1) A PTC resistor is connected in series in the output loop of the secondary winding of a switching power supply. However, the PTC resistor in series in the power loop will reduce the efficiency of the power converter, which will make the power converter unable to meet Level VI energy efficiency requirement.

(2) A fuse is connected in series in the output loop of the secondary winding of the switching power supply. However, the non-recoverable fuse blown makes the product less reliable and affects the after-sales quality of the power converter.

(3) A two-stage overcurrent protection circuit is used. A current sampling resistor is connected in series in the output loop of the secondary winding of the switching power supply. In addition, peripheral devices such as comparators are added to provide overcurrent protection of the second stage. However, it is not conducive to the miniaturization of the product design, and the cost will also be increased.

In order to improve the safety as well as to satisfy the LPS testing requirements, Chinese patent CN101783595B discloses a method for over-power compensation of a flyback power supply, in which the following two schemes are described in the Background: 1. As shown in FIG. 3 of the patent document, power compensation for the PWM chip is achieved by introducing a compensation voltage from an input voltage of a primary winding of a transformer to a current detection pin CS of the PWM chip. But this power compensation continues. 2. As shown in FIG. 4 of the patent document, when an increase of the output voltage Vout is detected, the power compensation circuit is turned on.

With the development of consumer electronics, there is a growing market demand for high power density superfast charging switching power supplies for 5G and large-capacity battery applications, such as fast-charging chargers or adapters with wide output voltage (5V-24V) and output power greater than 50 W. However, this power compensation method is not suitable for these wide output range switching power supplies.

SUMMARY OF THE INVENTION

In view of the above-described situation, a main purpose of the present invention is to provide a switching power supply, a power adapter, and a charger, which will not have excess output current when outputting a low voltage even if there is a fault such as short circuit, thus improving the product safety performance, and also outputting a rated maximum limit power when outputting higher voltage.

In order to achieve the purpose, the technical scheme adopted by the invention is as follows:

A switching power supply comprises a current-mode PWM control unit and a transformer. The current-mode PWM control unit comprises a current detection terminal Is used for detecting the current in a primary winding of the transformer and thereby controlling the power transfer. The switching power supply further comprises a DC power supply circuit and a power compensation auxiliary circuit connected in series. An input of the DC power supply circuit is connected to an auxiliary voltage output which outputs an auxiliary voltage Vi associated with an output voltage V0 of the switching power supply. An output of the power compensation auxiliary circuit is connected to the current detection terminal Is. The power compensation auxiliary circuit is used to determine the output voltage V0 of the DC power supply circuit, e.g., when the current output voltage V0 of the switching power supply is not greater than a threshold voltage, the power compensation auxiliary circuit generates a DC voltage to provide a compensation voltage to the current detection terminal Is; and when the current output voltage V0 of the switching power supply is greater than the threshold voltage, the power compensation auxiliary circuit does not generate the DC voltage and thus does not provide a compensation voltage to the current detection terminal Is. The threshold voltage is within the output voltage range of the switching power supply.

Preferably, the transformer further comprises a first auxiliary winding with a first auxiliary voltage output for generating a first auxiliary voltage VL associated with the output voltage V0, and a second auxiliary winding with a second auxiliary voltage output for generating a second auxiliary voltage VH associated with the output voltage V0. The first auxiliary voltage VL is less than the second auxiliary voltage VH. The power compensation auxiliary circuit comprises a switch K, a comparator A1 and a voltage generation circuit. The DC power supply circuit comprises a first DC power supply circuit, a second DC power supply circuit, and a third DC power supply circuit. The first DC power supply circuit has an input connected to the first auxiliary voltage output or the second auxiliary voltage output. The output of the first DC power supply circuit, the switch, the voltage generation circuit and the current detection terminal Is are connected in series sequentially. The third DC power supply circuit has an input connected to the first auxiliary voltage output and an output connected to a first input of the comparator A1. The second DC power supply circuit has an input connected to the second auxiliary voltage output and an output connected to a second input of the comparator A1. The comparator A1 is used for comparing the output voltage of the third DC power supply circuit with the output voltage of the second DC power supply circuit. When the current output voltage of the switching power supply is not greater than the threshold voltage, the comparator outputs an control signal to control the switch K to be on, and the voltage generation circuit generates an output voltage, thus providing a compensation voltage to the current detection terminal. When the current output voltage of the switching power supply is greater than the threshold voltage, the comparator outputs an control signal to control the switch K to be off, and the voltage generation circuit does not generate the output voltage, thus not providing a compensation voltage to the current detection terminal.

Preferably, the power compensation auxiliary circuit comprises a P-type semiconductor switch. The DC power supply circuit provides a second voltage VA and a first voltage VB respectively to a current input terminal and a control terminal of the P-type semiconductor switch. At least one of the second voltage VA and the first voltage VB is related to the current output voltage of the switching power supply. When the current output voltage V0 of the switching power supply is not greater than the threshold voltage, the difference between the second voltage VA and the first voltage VB is greater than a breakover voltage between the current input terminal and the control terminal of the P-type semiconductor switch, and the P-type semiconductor switch turns on, and the power compensation auxiliary circuit generates a DC voltage so as to provide a compensation voltage to the current detection terminal. When the current output voltage V0 of the switching power supply is greater than the threshold voltage, the difference between the second voltage VA and the first voltage VB is less than the breakover voltage between the current input terminal and the control terminal of the P-type semiconductor switch, and the P-type semiconductor switch turns off, and the power compensation auxiliary circuit does not generate a DC voltage and thus does not provide a compensation voltage to the current detection terminal.

Preferably, the P-type semiconductor switch comprises a PNP triode or a P-channel field effect transistor. The current input terminal and the control terminal of the PNP triode are the emitter and the base respectively. The current input terminal and the control terminal of the P-channel field effect transistor are the source and the gate respectively.

Preferably, the power compensation auxiliary circuit further comprises a resistor divider module comprising a first resistor R1 and a second resistor R2. The collector of the PNP triode is connected to the current detection terminal Is through the second resistor R2, and the current detection terminal Is is connected to a sampling resistor Rs of the primary winding of the transformer through the first resistor R1. When the PNP triode is turned on, the second voltage VA provides the compensation voltage to the current detection terminal by applying voltage to the first resistor R1 and the second resistor R2.

Preferably, the transformer further comprises a first auxiliary winding for generating a first auxiliary voltage VL associated with the output voltage, and a second auxiliary winding for generating a second auxiliary voltage VH associated with the output voltage. The first auxiliary voltage VL is less than the second auxiliary voltage VH. The DC power supply circuit comprises a first DC power supply circuit used for outputting the first voltage VB based on the input first auxiliary voltage VL, and a second DC power supply circuit used for outputting the second voltage VA based on the input second auxiliary voltage VH.

Preferably, the second DC power supply circuit comprises a third resistor R3, an N-channel MOS (metal oxide semiconductor) transistor Q3, a first voltage stabilizing diode ZD1 and a capacitor C1. The first DC power supply circuit comprises a second voltage stabilizing diode ZD2. The second auxiliary voltage VH is grounded through the third resistor R3 and the first voltage stabilizing diode ZD1. The anode of the first voltage stabilizing diode ZD1 is grounded. The drain, gate and source of the N-channel MOS transistor are respectively connected to the second auxiliary voltage VH, to the cathode of the first voltage stabilizing diode ZD1, to the emitter of the PNP triode Q2, wherein the emitter of the PNP triode Q2 outputs the second voltage VA. The first auxiliary voltage VL is connected to the base of the PNP triode Q2 through the second voltage stabilizing diode ZD2. The anode of the second voltage stabilizing diode ZD2 is connected to the first auxiliary voltage VL, and the voltage at the base of the PNP triode Q2 is the first voltage VB.

Preferably, the second DC power supply circuit comprises a voltage stabilizing chip outputting the second voltage VA based on the input second auxiliary voltage VH, wherein the second voltage VA is a set voltage value or a voltage value associated with the second auxiliary voltage VH. The first DC power supply circuit comprises a second voltage stabilizing diode ZD2. The first auxiliary voltage VL is connected to the base of the PNP triode Q2 through the second voltage stabilizing diode ZD2. The cathode of the second voltage stabilizing diode ZD2 is connected to the base of the PNP triode Q2, and the voltage at the base of the PNP triode Q2 is the first voltage VB.

Preferably, the transformer further comprises an auxiliary winding for generating an auxiliary voltage Vi associated with the output voltage of the switching power supply. The DC power supply circuit comprises a first DC power supply circuit used for outputting the first voltage VB based on the input auxiliary voltage Vi, and a second DC power supply circuit used for outputting the second voltage VA based on the input auxiliary voltage Vi.

Preferably, a stabilized voltage value of the second voltage stabilizing diode ZD2 is determined based on the threshold voltage.

Preferably, the switching power supply further comprises a third voltage stabilizing diode ZD3 and a fourth voltage stabilizing diode ZD4. The second voltage VA is connected to a power supply terminal VCC of the PWM control unit through the third voltage stabilizing diode ZD3. The first auxiliary voltage VL is connected to the power supply terminal VCC of the PWM control unit through the fourth voltage stabilizing diode ZD4. The cathodes of the third voltage stabilizing diode ZD3 and the fourth voltage stabilizing diode ZD4 are connected to the power supply terminal VCC of the PWM control unit. The stabilized voltage value of the first voltage stabilizing diode ZD1 is determined by the power supply voltage range of the power supply terminal VCC of the PWM control unit.

Preferably, the output voltage range of the switching power supply is 5-24V, or at least partially overlaps with the voltage range of 5-24V.

The invention also provides a power adapter or charger, comprising any one of the aforementioned switching power supplies.

By setting the threshold voltage, when the current output voltage V0 of the switching power supply is not greater than the threshold voltage, the power compensation auxiliary circuit generates the output voltage, so as to provide a compensation voltage to the current detection terminal Is. The compensation voltage is superimposed on the voltage across the current sampling resistor, so that the PWM control unit detects a larger voltage through the current detection terminal Is, thereby reducing the duty cycle of the PWM signal at a certain lower power below the maximum limit output power, and finally maintaining the power of the primary winding at the lower power. That is, the output power is maintained at a lower power, which in turn keeps the output current at a lower value, making it easier to meet the LPS requirements, or to reduce the safety risk in practical application. In addition, since the power compensation auxiliary circuit stops providing the compensation voltage to the current detection terminal Is when the output voltage V0 is greater than the threshold voltage, the actual output power of the switching power supply in the output voltage range is not reduced (for example, the output of the switching power supply can reach its maximum limit output power), and the charging efficiency is improved, which is particularly important for fast charging power adapters, while stopping provision of the compensation voltage can reduce the power consumption and improve the energy efficiency of the switching power supply.

In some embodiments, the output voltage ripple is smaller and the audible noise is smaller, compared to switching power supplies that do not employ the power compensation auxiliary circuit of the present invention.

In a preferred embodiment, a P-type semiconductor switch (such as a PNP triode) is used both as a device to compare the output voltage V0 and the threshold voltage by comparing the first voltage VB and the second voltage VA, and as a switch to control the power supply channel from the DC power supply circuit to the power compensation auxiliary circuit, with a simple circuit structure and relatively small size and power consumption.

Other advantages of the present invention will be described in specific embodiments by means of specific technical features and technical solutions. Through the presented technical features and technical solutions those skilled in the art will understand advantages brought about by the technical features and technical solutions.

BRIEF DESCRIPTION OF THE DRAWINGS

Preferred embodiments according to the present invention will be described below with reference to the accompanying drawings. In the figures.

DETAILED DESCRIPTION

Figure 1:
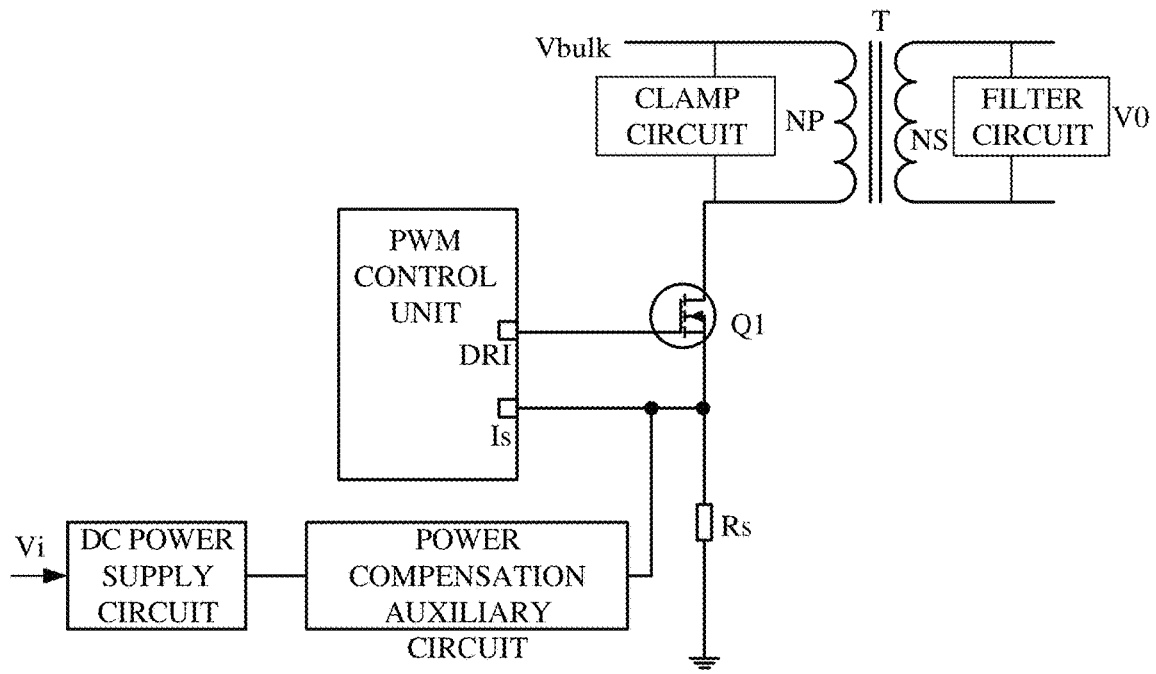
FIG. 1 is a schematic diagram of a switching power supply according to a preferred embodiment of the present invention.

FIG. 1 is a schematic diagram of a switching power supply according to one embodiment of the invention. The switching power supply has a wide output voltage range, i.e. a wide output voltage range, such as 2-30V, or 5-24V, or a variable output voltage (5V-9V/5V-11V/5V-12V/5V-15V/5V-20V), or its output voltage range $V_{min}$-$V_{max}$ overlaps at least partially with the voltage range of 5-24V. The switching power supply is especially suitable for fast charging power adapters or chargers with high power density and wide output voltage.

The switching power supply comprises a current-mode PWM control unit (e.g., a current-mode PWM control chip), a transformer T, a power switch transistor Q1, a current sampling resistor Rs, a DC power supply circuit, a power compensation auxiliary circuit, a clamp circuit, a filter circuit, and a voltage feedback circuit (not shown in the figure). The primary winding NP of the transformer T is fed with a rectified DC voltage Vbulk (the DC voltage Vbulk is rectified and filtered by AC). The clamp circuit is connected in parallel with the primary winding to provide clamp protection, and the secondary winding NS outputs a voltage V0 through the filter circuit. The primary winding is grounded through the power switch transistor Q1 and the current sampling resistor Rs which are connected in series. The current-mode PWM control unit further comprises a voltage detection terminal (not shown in the figure) and a current detection terminal Is. A voltage feedback signal obtained from the output voltage V0 by the voltage feedback circuit is input to the voltage detection terminal, and the PWM control unit generates a corresponding PWM control signal based on the voltage feedback signal, so that the output voltage is controlled and maintained at the desired voltage V0. The current detection end Is is used to detect the primary winding current of the transformer T by detecting the voltage on the current sampling resistor Rs. When the detected voltage is greater than a set voltage, the duty cycle of the PWM signal for controlling the power switch transistor Q1 is reduced to control the current of the primary winding, namely to control the power of the primary winding, which in turn control the power transfer of the transformer T and thus the output power.

Figure 3:
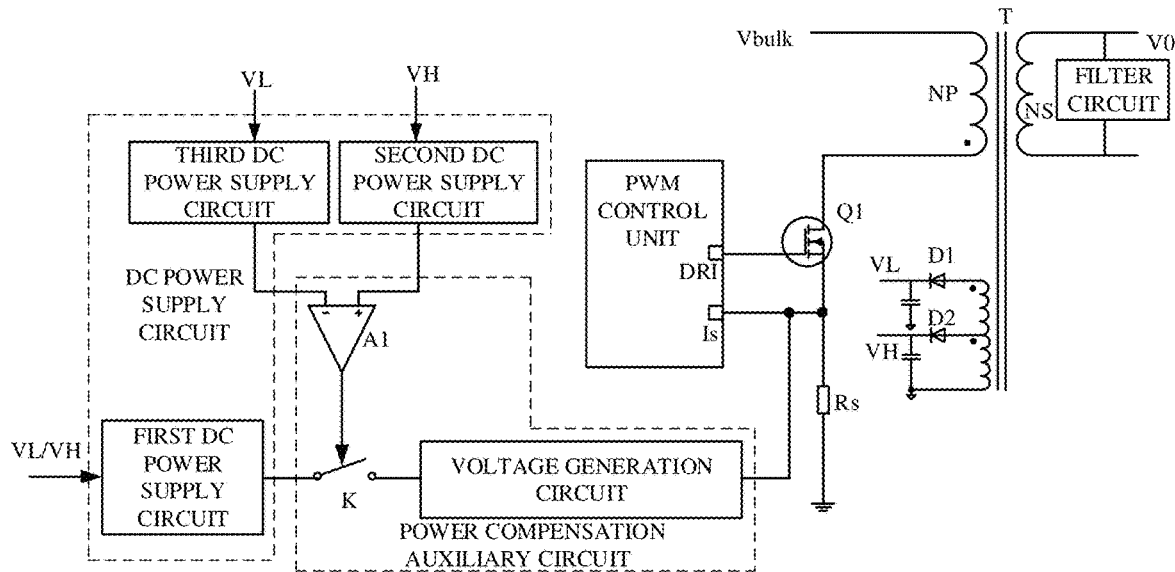
FIG. 3 is a schematic diagram of a switching power supply according to another preferred embodiment of the present invention.

The DC power supply circuit connects sequentially with the power compensation auxiliary circuit and the current detection terminal Is in series. The input of the DC power supply circuit is connected to the auxiliary voltage output. The auxiliary voltage output outputs an auxiliary voltage Vi associated with the output voltage V0 of the switching power supply. The output of the power compensation auxiliary circuit is connected to the current detection terminal Is. As shown in FIG. 3, the voltage Vi may be the output voltage VH or VL of the auxiliary winding.

A threshold voltage is preset in the output voltage range ($V_{min}$-$V_{max}$) of the switching power supply, and the threshold voltage is greater than $V_{min}$ and less than $V_{max}$, for example, the threshold voltage may be approximately equal to $V_{max}/2$.

Since the PWM control unit actually controls the output power by controlling the power of the primary winding, the PWM control unit only limits the maximum output power. For a switching power supply with a wide output voltage range, when the output voltage is at a small value, if the load is overloaded or short-circuited, the output current will become very large and may exceed the range specified by the LPS testing, or the large current may cause a safety hazard in practical applications. For example, the output range of the switching power supply is 5-20V, and the maximum limit power is 60 W, when the output voltage is 5V, if the load is short-circuited, the output current can reach 12 A before triggering the PWM control unit to reduce the PWM duty cycle for the power protection action. However, the 12 A current is greater than 8 A required for the LPS testing, thus failing the LPS testing, or posing a great safety risk to the practical application. When the output voltage is 20V, even if the load is short-circuited, the power protection action of the PWM control unit is triggered once the maximum output current reaches to 3 A (60 W/20V), and the maximum current does not exceed the LPS testing requirement, and the risk in practical application is also low. It can be seen that in such a switching power supply with a wide output voltage range, when a smaller voltage is output, the output current is more likely to exceed the safety range. As long as the output current is controlled not to exceed the safety range at a smaller voltage, the output current at a higher voltage will not exceed the safety range.

The application solves the above problems by setting the above threshold voltage so that when the current output voltage V0 of the switching power supply is not greater than the threshold voltage, the power compensation auxiliary circuit generates a DC voltage, so as to provide a compensation voltage to the current detection terminal Is. The compensation voltage is superimposed with the voltage on the current sampling resistor Rs, so that the voltage detected by the PWM control unit through the current detection terminal Is increases, so as to reduce the duty cycle of the PWM signal at a certain lower power below the maximum limit output power, and finally maintain the power of the primary winding at the lower power. That is, the output power is maintained at a lower power, which in turn keep the output current at a smaller value, making it easier to meet the requirements of LPS testing, or to reduce the safety risk in practical applications. In addition, when the output voltage V0 is greater than the threshold voltage, the power compensation auxiliary circuit does not generate a DC voltage, so that the compensation voltage is not supplied to the current detection terminal Is. Therefore, the actual output power of the switching power supply in this output voltage range is not reduced (for example, the output of the switching power supply can reach its maximum limit output power of 60 W. When the output voltage V0 is greater than the threshold voltage, the switching power supply can output 60 W, but when the output voltage V0 is less than the threshold voltage, the switching power supply can output less than 60 W), which improves the charging efficiency. It is especially important for fast charging power adapters or chargers. In addition, stopping the provision of the compensation voltage can reduce power consumption and improve the energy efficiency of the switching power supply.

The magnitude of the compensation voltage may be $$V_{Rs} - \frac{V_{min} \cdot I_{max}}{P_{max}} V_{Rs},$$

wherein, $V_{RS}$ is the voltage on the sampling resistor Rs when the switching power supply outputs the maximum limit output power without power compensation auxiliary circuit, $V_{min}$ is the minimum value of the output voltage range of the switching power supply, and $I_{max}$ is the maximum limit output current.

For example, when the output voltage range is 5-20V, $V_{Rs}$=1V, $P_{max}$=60 W, and $I_{max}$=8 A:

$$V_{min} \cdot I_{max} = 5v * 8A = 40 \text{ W},$$

$$V_{Rs} - \frac{V_{min} \cdot I_{max}}{P_{max}} V_{Rs} = 1 - 40/60 = 0.33 \text{ V},$$

and the magnitude of the compensation voltage may be taken to be 330 mV. In some specific applications, the magnitude of the compensation voltage may be between 50 mV to 700 mV.

Figure 2:
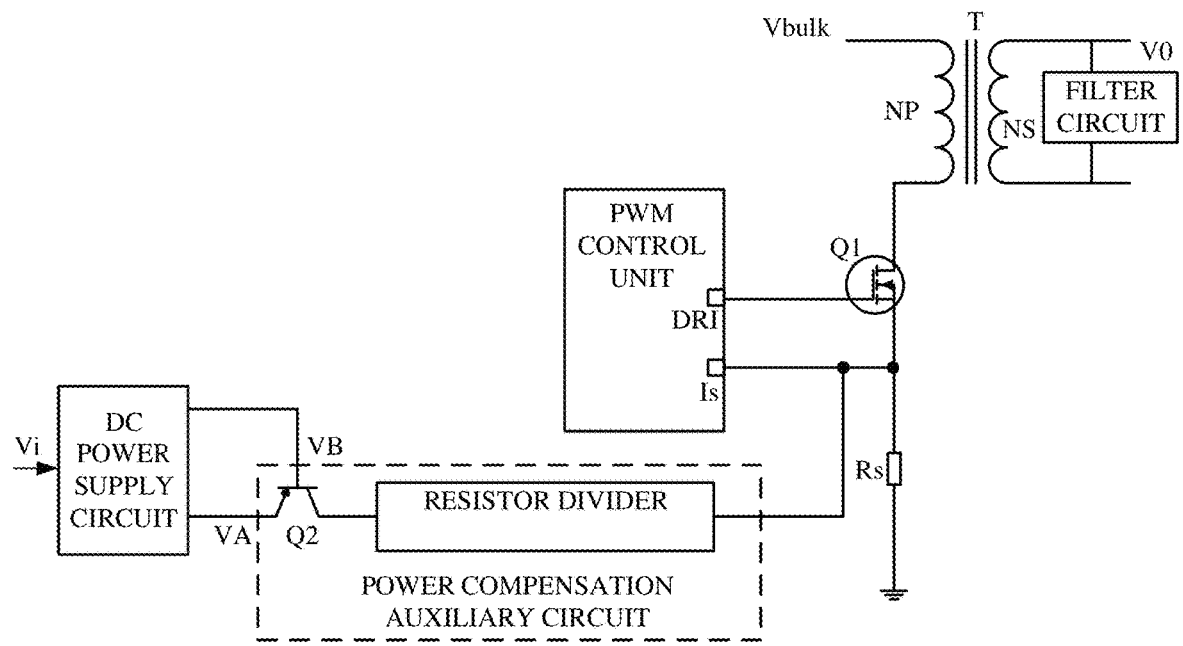
FIG. 2 is a schematic diagram of a switching power supply according to another preferred embodiment of the present invention.

FIG. 2 is a more preferred embodiment of the switching power supply of the present invention. The power compensation auxiliary circuit comprises a PNP triode Q2 and a resistor divider module. The DC power supply circuit provides a second voltage VA and a first voltage VB to an emitter and a base of the PNP triode Q2, respectively, according to an input voltage Vi. The input of the resistor divider module is connected to the collector of the PNP triode Q2, the output of the resistor divider module is connected to the current detection terminal Is. At least one of the second voltage VA and the first voltage VB is related to the current output voltage V0 of the switching power supply. When the current output voltage V0 of the switching power supply is not greater than the threshold voltage, the difference between the second voltage VA and the first voltage VB is greater than the emitter-base breakover voltage of the PNP triode Q2 (the breakover voltage is usually about 0.7V). The PNP triode Q2 is turned on, and the power compensation auxiliary circuit generates an output voltage, thus providing the compensation voltage to the current detection terminal Is through the resistor divider module. When the current output voltage V0 of the switching power supply is greater than the threshold voltage, the difference between the second voltage VA and the first voltage VB is less than the emitter-base breakover voltage $V_{EB}$ of the PNP triode Q2. The PNP triode Q2 is turned off, and the power compensation auxiliary circuit does not generate the output voltage, thus not providing the compensation voltage to the current detection terminal Is. The PNP triode Q2 is used as a device for comparing the output voltage V0 and the threshold voltage by comparing the magnitude between the first voltage VB and the second voltage VA, and is also used as a switch for controlling a power supply channel from the DC power supply circuit to the power compensation auxiliary circuit. The circuit is simple in structure, and its size and power consumption are relatively small.

In some embodiments, the second voltage VA is a fixed value, and the first voltage VB is a voltage positively related to the output voltage V0, such as a multiple of the output voltage V0.

In other embodiments, the first voltage VB is a fixed value and the second voltage VA is a voltage related to the output voltage V0.

Figure 4:
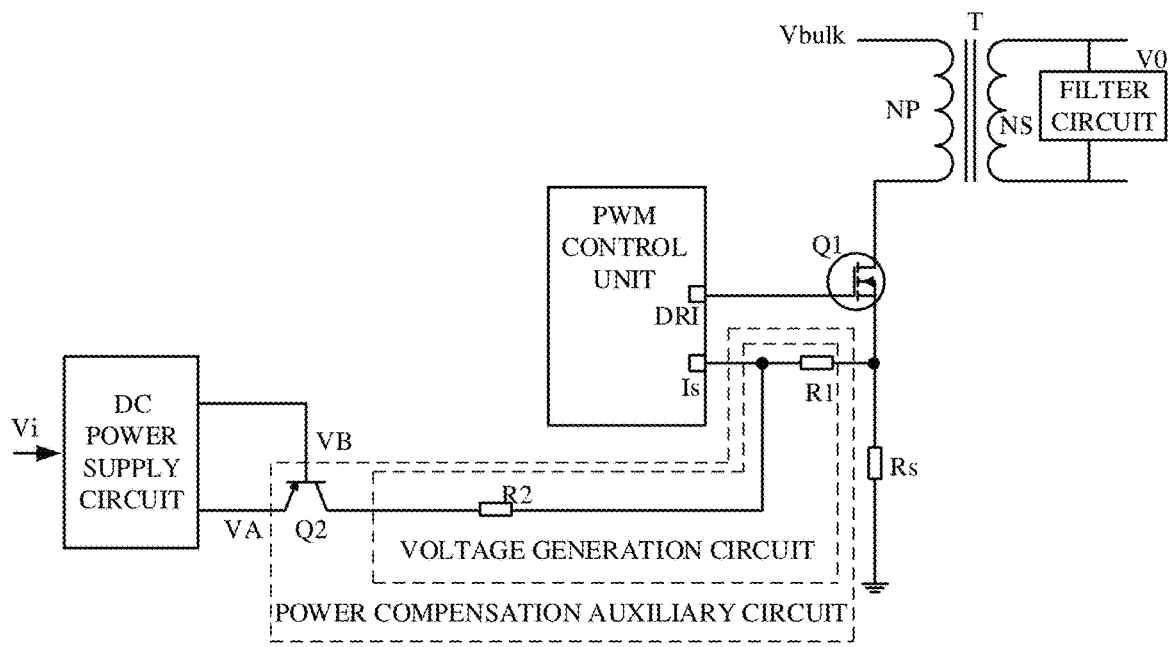
FIG. 4 is a schematic diagram of a switching power supply according to another preferred embodiment of the present invention.

FIG. 4 is a more preferred embodiment of the switching power supply of the present invention. The power compensation auxiliary circuit further comprises a resistor divider module. The resistor divider module comprises a first resistor R1 and a second resistor R2. A collector of the PNP triode Q2 is connected to the current detection terminal Is through the second resistor R2, and the current detection terminal Is is connected to the sampling resistor Rs of the primary winding of the transformer T through the first resistor R1. When the PNP triode Q2 is turned on, the second voltage VA provides a compensation voltage to the current detection terminal Is by applying voltage to the first resistor R1 and the second resistor R2, and the compensation voltage is:

$$(V_A - 0.7) \cdot \frac{R_s + R_1}{R_s + R_1 + R_2}.$$

Figure 5:
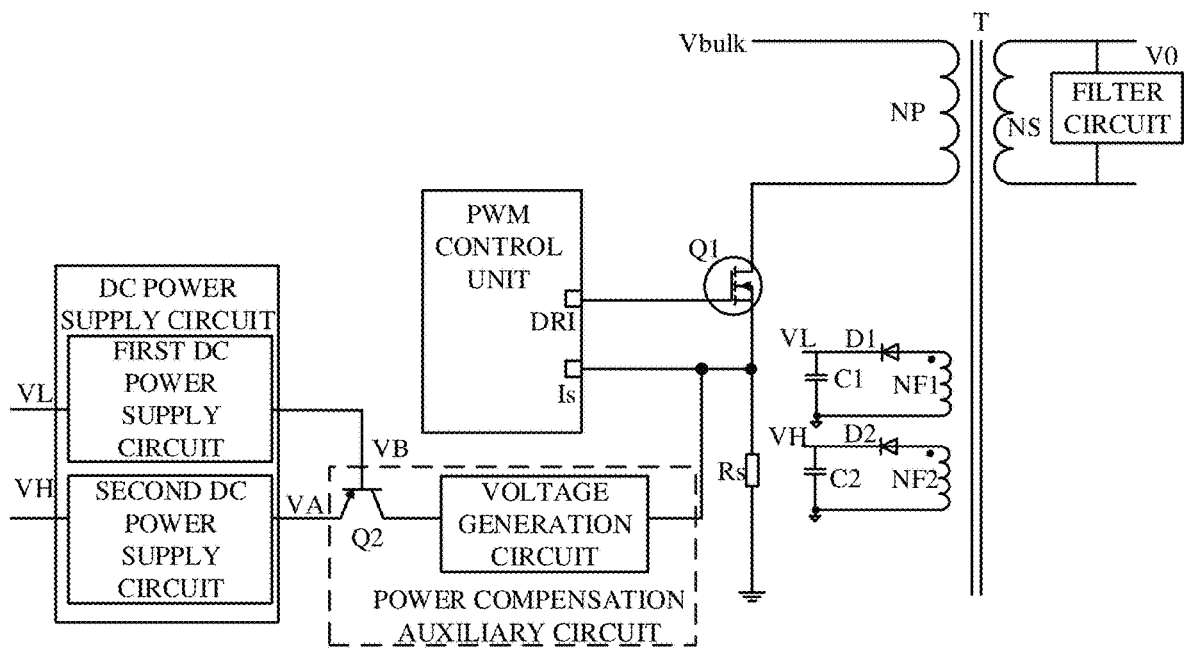
FIG. 5 is a schematic diagram of a switching power supply according to another preferred embodiment of the present invention.

FIG. 5 is a more preferred embodiment of the switching power supply of the present invention. The transformer T further comprises a first auxiliary winding having a first auxiliary voltage output for generating a first auxiliary voltage VL (e.g., equal to V0) associated with the output voltage (the induced electromotive force generated on the first auxiliary winding passes through a first diode D1 and a capacitor C1 to generate the first auxiliary voltage VL), and a second auxiliary winding having a second auxiliary voltage output for generating a second auxiliary voltage VH associated with the output voltage. The first auxiliary voltage VL is less than the second auxiliary voltage VH (e.g., equal to 3V0) (the induced electromotive force generated on the second auxiliary winding passes through a second diode D2 and a capacitor C2 to generate the second auxiliary voltage VH). The DC power supply circuit comprises a first DC power supply circuit and a second DC power supply circuit. The first DC power supply circuit is used for outputting a first voltage VB based one the input first auxiliary voltage VL, and the second DC power supply circuit is used for outputting a second voltage VA based on the input second auxiliary voltage VH.

Figure 6:
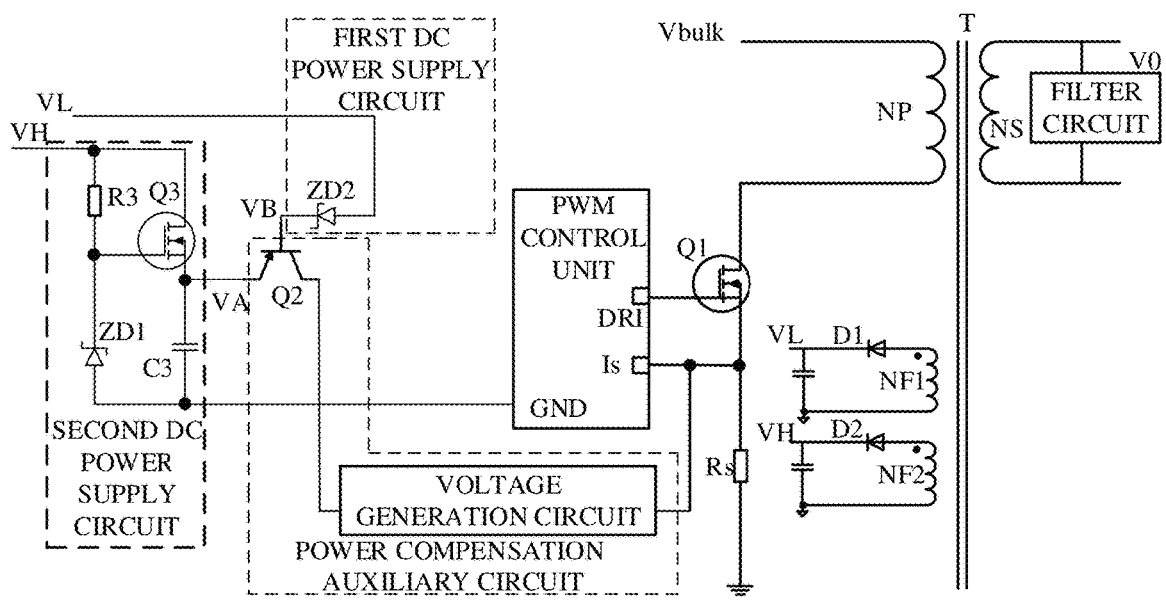
FIG. 6 is a schematic diagram of a switching power supply according to another preferred embodiment of the present invention.

FIG. 6 is a more preferred embodiment of the switching power supply of the present invention. The second DC power supply circuit comprises a third resistor R3, an N-channel MOS transistor Q3, a first voltage stabilizing diode ZD1 and a capacitor C3. The first DC power supply circuit comprises a second voltage stabilizing diode ZD2. The second auxiliary voltage VH is grounded through the third resistor R3 and the first voltage stabilizing diode ZD1, and the anode of the first voltage stabilizing diode ZD1 is grounded. The drain, gate and source of the N-channel MOS transistor Q3 are respectively connected to the second auxiliary voltage VH, the cathode of the first voltage stabilizing diode ZD1, and the emitter of the PNP triode Q2, wherein the emitter of the PNP triode Q2 outputs the second voltage VA. The first auxiliary voltage VL is connected to the base of the PNP transistor Q2 through the second voltage stabilizing diode ZD2, and the anode of the second voltage stabilizing diode ZD2 is connected to the first auxiliary voltage VL, wherein the voltage on the base of the PNP triode Q2 is the first voltage VB. When VH≥$V_{ZD1}$, the first voltage stabilizing diode ZD1 is reversely broken down, the gate voltage of Q3 is clamped at $V_{ZD1}$, and Q3 is turned on. VH begins to charge the capacitor C3 until the voltage of the capacitor C3 reaches $V_{ZD1}$-Vth (Vth is the gate-source breakover threshold voltage of Q3), and the switch Q3 is turned off. The first voltage VA is maintained at $V_{ZD1}$-Vth. When VH≤$V_{ZD1}$, the first voltage stabilizing diode ZD1 cannot be broken down, and the gate voltage of Q3 is maintained at VH. Q3 remains on, and the first voltage VA is maintained at VH-Vth. When VA-$V_{EB}$-VL≥$V_{ZD2}$, the PNP triode Q2 is turned on, and is turned off otherwise.

Wherein $V_{EB}$ is the emitter-base breakover voltage of the PNP triode Q2, and $V_{ZD2}$ is the reverse breakdown voltage of the second voltage stabilizing diode ZD2.

In one embodiment, if VH=3V0, VL=V0, the reverse breakdown voltage of the first voltage stabilizing diode ZD1 is 16V, (1) For VH≥16V (i.e., V0≥16/3V=5.3V),
the PNP triode Q2 is turned on with the following relationship:

$VA-VB \geq 0.7V$, and VA=16V-Vth, VB=$V_{ZD2}$+V0, that is: (16V-Vth)-($V_{ZD2}$+V0)≥0.7V,
therefore, 16V-Vth-0.7V-V0≥$V_{ZD2}$,
therefore, V0≤15.3V-Vth-$V_{ZD2}$,
that is, the threshold voltage is (15.3V-Vth-$V_{ZD2}$).

If $V_{ZD2}$ is set as 5V, and Vth is 2.5V, then the threshold voltage is 7.8V, i.e., when the output voltage is 5.3V-7.8V, power compensation is required, and when the output voltage is greater than 7.8V, power compensation is not required.

(2) For VH<16V (i.e., V0<16/3V=5.3V),
the PNP triode Q2 is turned on with the following relationship:

$VA-VB \geq 0.7V$, and VA=3V0-Vth, VB=$V_{ZD2}$+V0,
therefore, (3V0-Vth)-($V_{ZD2}$+V0)≥0.7V, that is: 2V0-Vth-0.7V≥$V_{ZD2}$, therefore,
(Vth+0.7V+$V_{ZD2}$)/2≤V0.

If $V_{ZD2}$ is set as 5V, Vth is 2.5V, (Vth+0.7V+$V_{ZD2}$)/2=4.4V, and the minimum value of the output voltage is 5V, therefore, when the output voltage is 5V-5.3V, power compensation is required, and when the output voltage is less than 5V, it will not work properly.

In summary, when the output voltage is 5V-7.8V, power compensation is required; when the output voltage is greater than 7.8V, power compensation is not required. Therefore, when the output voltage V0 is not greater than the threshold voltage (15.3V-Vth-$V_{ZD2}$), the PNP triode Q2 is turned on, and power compensation is required.

It can be seen that, for a determined value of VA and the first auxiliary voltage VL, the threshold voltage value determines how large the reverse breakdown voltage $V_{ZD2}$ of the second voltage stabilizing diode ZD2 should be selected.

Figure 7:
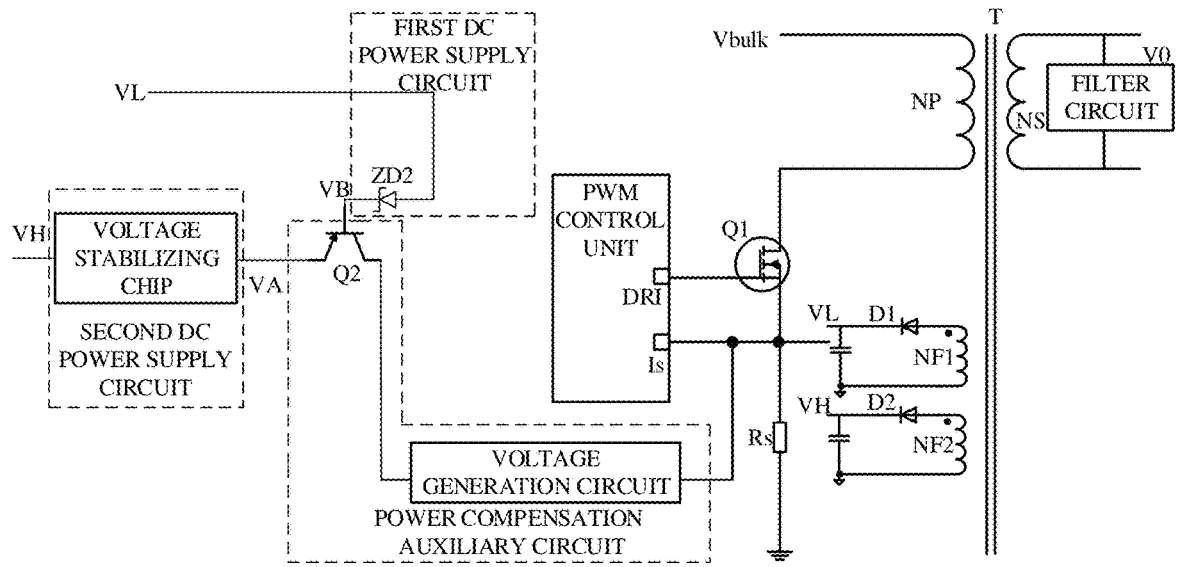
FIG. 7 is a schematic diagram of a switching power supply according to another preferred embodiment of the present invention.

FIG. 7 is a more preferred embodiment of a switching power supply according to the invention, which is substantially similar to that of FIG. 6, with the main differences comprising a difference in the second DC power supply circuit. The second DC power supply circuit comprises a voltage stabilizing chip, and the first DC power supply circuit comprises the second voltage stabilizing diode ZD2. The voltage stabilizing chip outputs a stable second voltage VA according to the second auxiliary voltage VH input, wherein the second voltage VA is a set voltage value (for example, 15-17V). The first auxiliary voltage VL is connected to the base of the PNP triode Q2 through the second voltage stabilizing diode ZD2, and the cathode of the second voltage stabilizing diode ZD2 is connected to the base of the PNP triode Q2, wherein the voltage on the base of the PNP triode Q2 is the first voltage VB.

Figure 8:
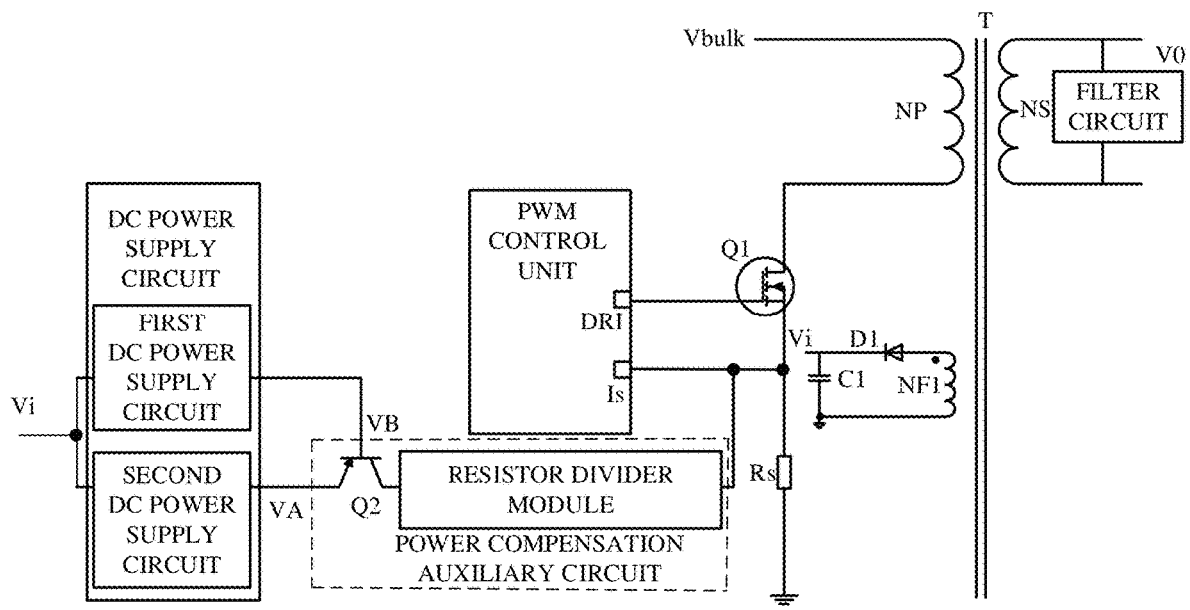
FIG. 8 is a schematic diagram of a switching power supply according to another preferred embodiment of the present invention.

FIG. 8 is a more preferred embodiment of the switching power supply of the invention, which is substantially similar to the switching power supply of FIG. 6, with the main differences comprising differences in the auxiliary winding and the DC power supply circuit. The transformer T further comprises an auxiliary winding for generating an auxiliary voltage Vi associated with the output voltage of the switching power supply. The DC power supply circuit comprises a first DC power supply circuit and a second DC power supply circuit. The first DC power supply circuit is used to output a first voltage VB according to the auxiliary voltage Vi input. The second DC power supply circuit is used to output a second voltage VA according to the input auxiliary voltage Vi. For example, the second DC power supply circuit of the present embodiment may employ a voltage stabilizing chip to output a fixed voltage value of the second voltage VA, and the first DC power supply circuit may employ the first DC power supply circuit as shown in FIG. 7.

Figure 9:
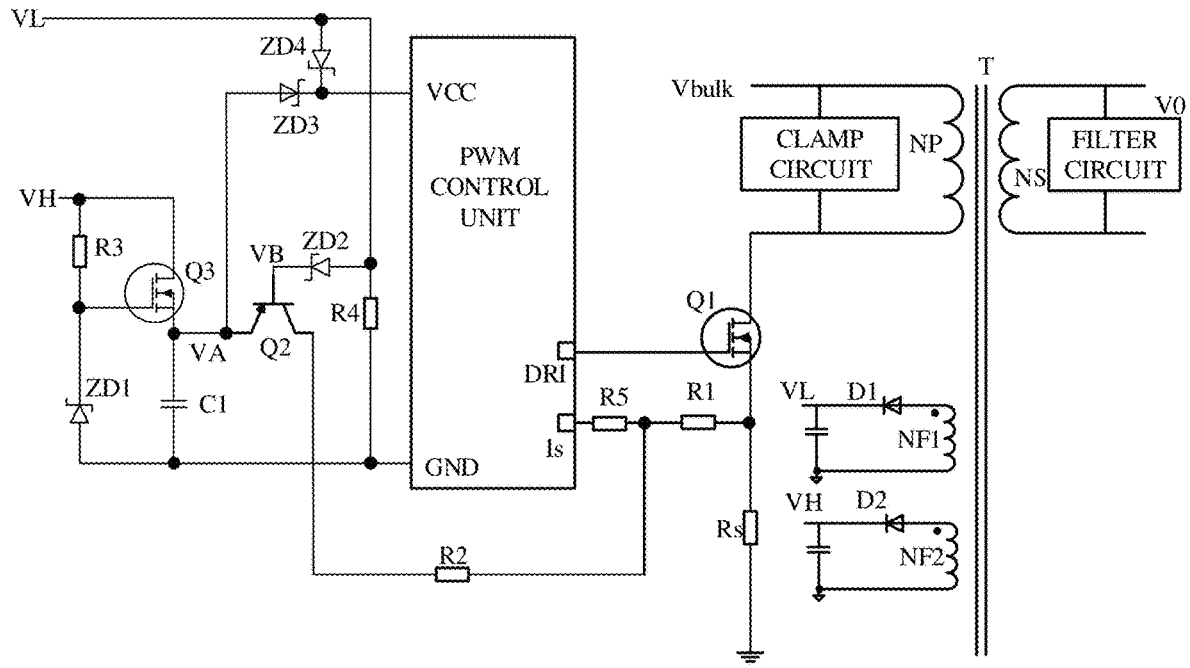
FIG. 9 is a schematic diagram of a switching power supply according to another preferred embodiment of the present invention.

FIG. 9 is a more preferred embodiment of the switching power supply of the present invention, which further comprises a third voltage stabilizing diode ZD3, a fourth voltage stabilizing diode ZD4, and a fourth resistor R4. The second voltage VA is connected to a power supply terminal VCC of the PWM control unit through the third voltage stabilizing diode ZD3. The first auxiliary voltage VL is connected to the power supply terminal VCC through the fourth voltage stabilizing diode ZD4. The cathode of the third voltage stabilizing diode ZD3 and the cathode of the fourth voltage stabilizing diode ZD4 are connected to the power supply terminal VCC of the PWM control unit. The stabilized voltage value of the first voltage stabilizing diode ZD1 is determined by a power supply voltage range of the power supply terminal VCC of the PWM control unit. In addition, the first auxiliary voltage VL is grounded through a fourth resistor R4.

According to the embodiment of FIG. 6, when $VH \geq V_{ZD1}$, the value of the second voltage VA is maintained at $V_{ZD1}$-Vth; when $VH < V_{ZD1}$, the value of the second voltage VA is maintained at VH-Vth.

(1) When VA>VL, $VCC = VA - V_{ZD3} = V_{ZD1} - Vth - VZD_{ZD3}$.

It can be seen that the stabilized voltage value of the first voltage stabilizing diode ZD1 is determined by the power supply voltage range of the power supply terminal VCC of the PWM control unit, wherein $VZD_3$ is the forward breakover voltage of the third voltage stabilizing diode ZD3, usually about 0.7V.

(2) when VA≤VL, $VCC = VL - V_{ZD4}$ ($V_{ZD4}$ is the forward breakover voltage of the fourth voltage stabilizing diode ZD4, usually about 0.7V).

Specific examples are as follows: if VH=3V0, VL=V0, Vth=2.5V, (1) when V0=5V, VA=15V−2.5V=12.5V, VL=5V, therefore, $VCC = VA - V_{ZD3} = 12.5V - 0.7V = 11.8V$.

(2) When V0=20V, VA=16V−2.5V=13.5V, VL=20V, therefore, $VCC = VL - V_{ZD4} = 20V - 0.7V = 19.3V$.

FIG. 3 is a more preferred embodiment of the switching power supply of the invention, wherein the transformer T further comprises a first auxiliary winding and a second auxiliary winding. The first auxiliary winding has a first auxiliary voltage output for generating a first auxiliary voltage VL associated with the output voltage. The second auxiliary winding has a second auxiliary voltage output for generating a second auxiliary voltage VH associated with the output voltage. The first auxiliary voltage VL is less than the second auxiliary voltage VH. The power compensation auxiliary circuit comprises a switch K, a comparator A1 and a voltage generation circuit. The DC power supply circuit comprises a first DC power supply circuit, a second DC power supply circuit and a third DC power supply circuit. The input of the first DC power supply circuit is connected to the first auxiliary voltage output or the second auxiliary voltage output. The output of the first DC power supply circuit, the switch K, the voltage generation circuit, and the current detection terminal Is are connected sequentially. The input of the third DC power supply circuit is connected to the first auxiliary voltage output, and the output of the third DC power supply circuit is connected to a first input (e.g., the inverting input) of the comparator A1 for inputting the first auxiliary voltage VL. The input of the second DC power supply circuit is connected to the second auxiliary voltage output, and the output of the second DC power supply circuit is connected to a second input (e.g., a non-inverting input) of the comparator A1. The comparator A1 is used to compare the voltage output from the third DC power supply circuit with the voltage output from the second DC power supply circuit, so that when the current output voltage V0 of the switching power supply is not greater than the threshold voltage, a control signal is output to control the switch K to be ON, and the voltage generation circuit generates an output voltage, so as to provide a compensation voltage to the current detection terminal Is. When the current output voltage V0 of the switching power supply is greater than the threshold voltage, the output control signal controls the switch K to be OFF, and the voltage generation circuit generates no output voltage, so that no compensation voltage is provided to the current detection terminal Is. The second DC power supply circuit above may employ the second DC power supply circuit in FIG. 6, so that the voltage input to the non-inverting input is the second voltage VA. The first DC power supply circuit above may employ a resistor, so that the voltage input to the inverting input is VL. The voltage generation circuit can employ the resistor divider module in FIG. 4.

Figure 10:
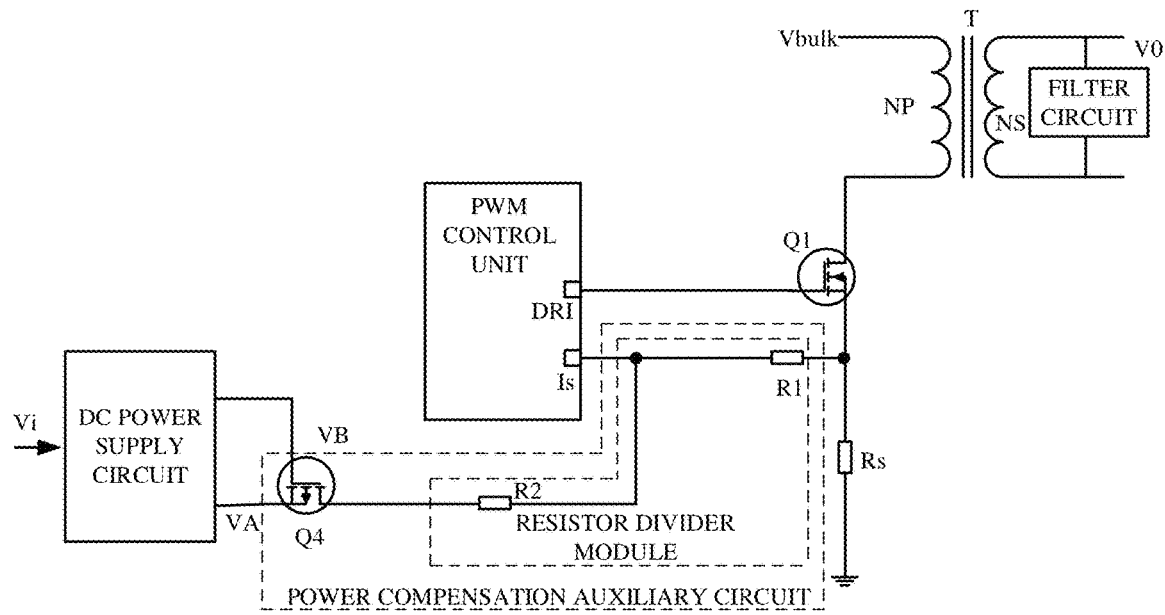
FIG. 10 is a schematic diagram of a switching power supply according to another preferred embodiment of the present invention.

FIG. 10 is a more preferred embodiment of the switching power supply of the present invention, which is substantially the same as the switching power supply of FIG. 4, with the main difference that PNP triode Q2 is replaced by a P-channel field effect transistor Q4. As shown in FIG. 10, the power compensation auxiliary circuit comprises a P-channel field effect transistor Q4. The DC power supply circuit provides a second voltage VA and a first voltage VB to the source and the gate of the P-channel field effect transistor Q4 respectively. At least one of the second voltage VA and the first voltage VB is related to the current output voltage V0 of the switching power supply. When the current output voltage V0 of the switching power supply is not greater than the threshold voltage, the difference between the second voltage VA and the first voltage VB is greater than the source-gate breakover voltage of the P-channel field effect transistor Q4, and the P-channel field effect transistor Q4 is turned on, and the power compensation auxiliary circuit generates an output voltage, thereby providing a compensation voltage to the current detection terminal. When the current output voltage V0 of the switching power supply is greater than the threshold voltage, the difference between the second voltage VA and the first voltage VB is less than the source-gate breakover voltage of the P-channel field effect transistor Q4, and the P-channel field effect transistor Q4 is turned off, and the power compensation auxiliary circuit does not generate the output voltage, thereby not providing a compensation voltage to the current detection terminal.

Figure 11:
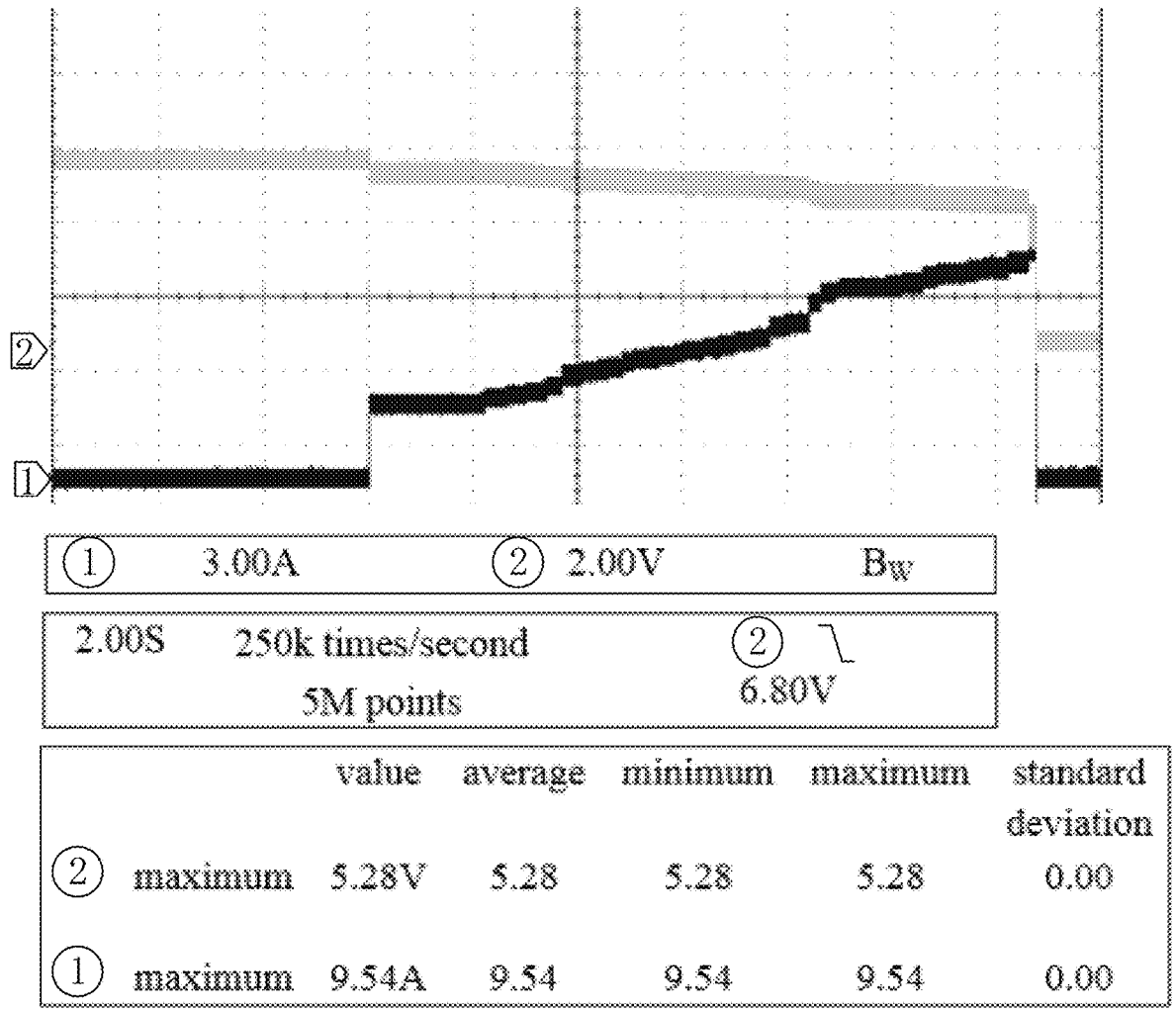
FIG. 11 is a waveform diagram of output current and output voltage without using a switching power supply of the present invention.
Figure 12:
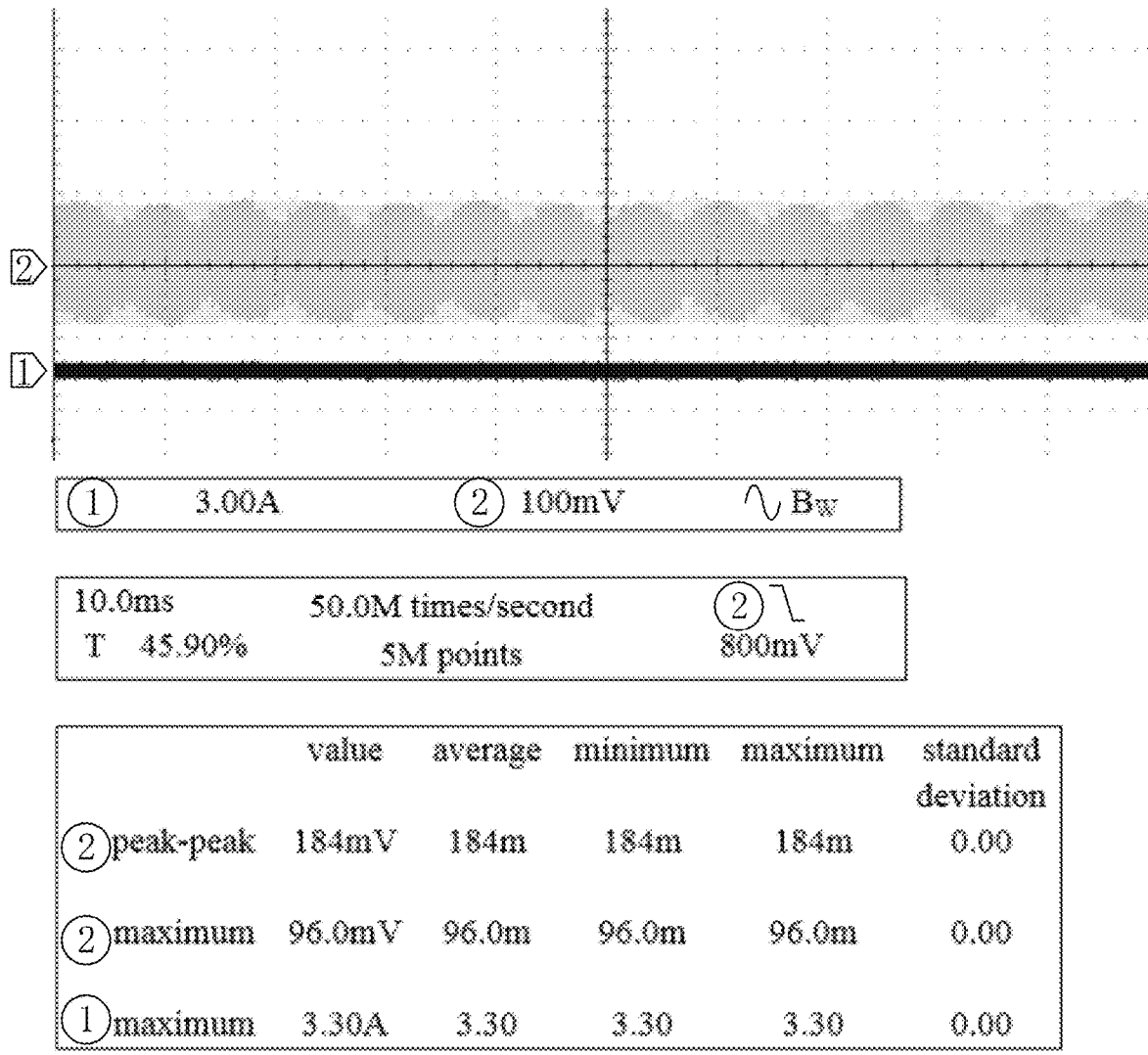
FIG. 12 shows the output voltage ripples without using a switching power supply of the present invention.

FIG. 11 is a waveform diagram of the output current and the output voltage without using the switching power supply of the present invention. Curve 2 and Curve 1 in the diagram show the output current and the output voltage of the switching power supply respectively. It can be seen that the output current reaches a maximum of 9.54 A before entering the current limiting protection, which does not meet the LPS requirement of less than 8 A. FIG. 12 shows the output voltage ripple without using the switching power supply of the present invention, and it can be seen that the output voltage ripple reaches 184 mV.

Figure 13:
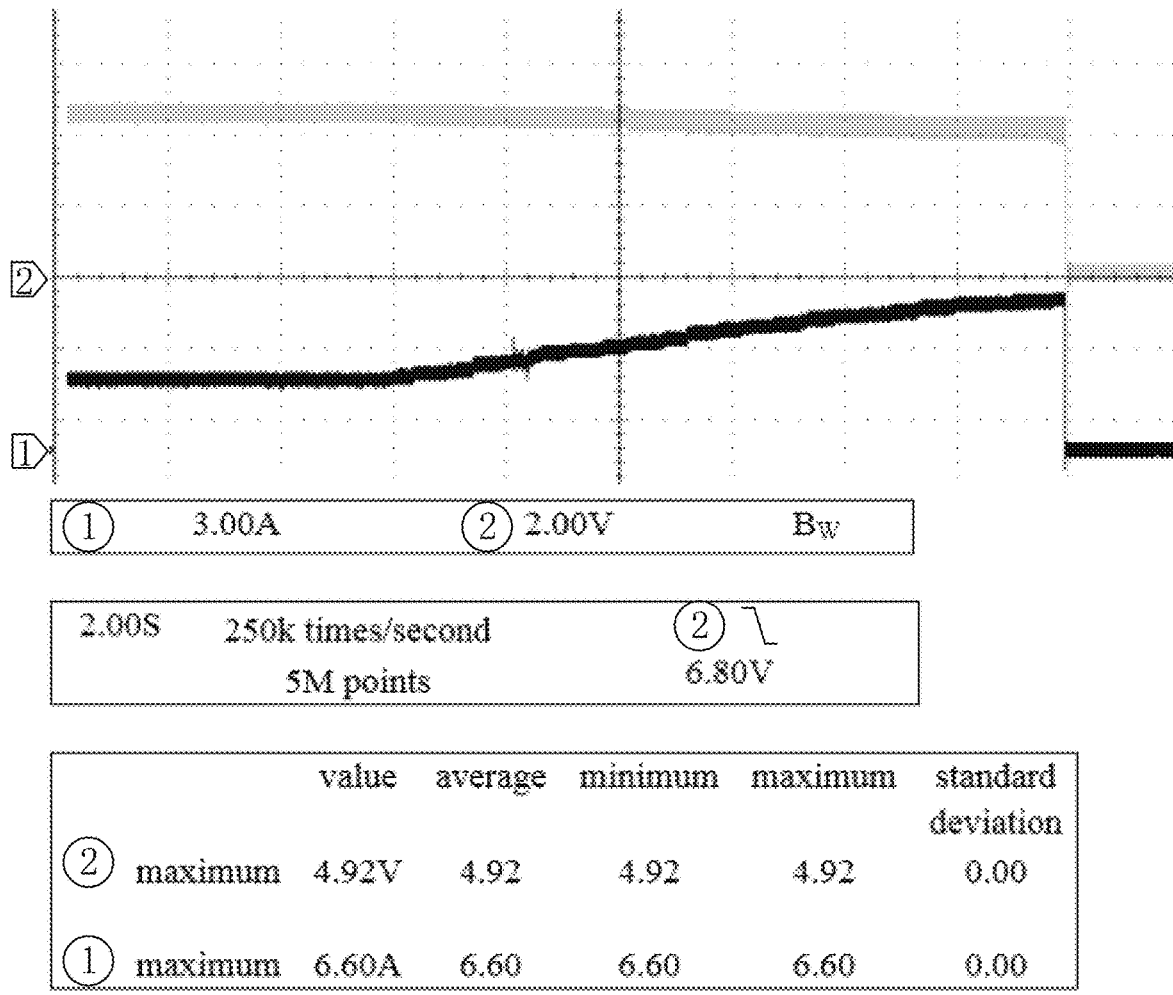
FIG. 13 is a waveform diagram of output current and output voltage of a switching power supply according to an embodiment of the present invention.
Figure 14:
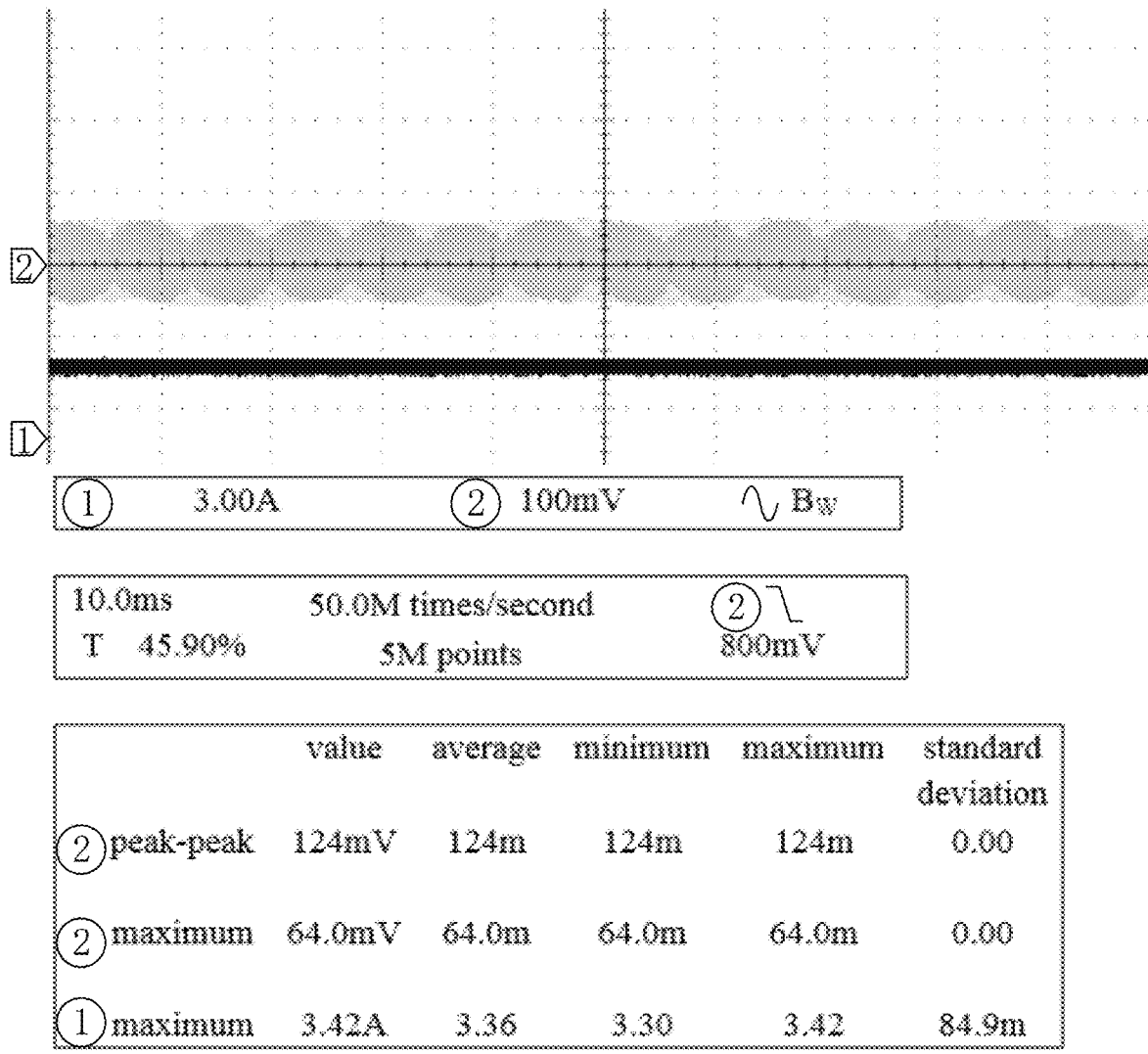
FIG. 14 shows output voltage ripples of a switching power supply according to an embodiment of the present invention.

FIG. 13 is a waveform diagram of the output current and the output voltage of the switching power supply according to an embodiment of the present invention. Curve 2 and Curve 1 in the diagram show the output current and the output voltage of the switching power supply respectively. It can be seen that the current limiting protection is performed when the output current reaches 6.6 A, which meets the LPS requirement of less than 8 A. FIG. 14 shows the output voltage ripple of the switching power supply of the present invention. It can be seen that the output voltage ripple is only 124 mV, which shows that the present invention can further reduce the output voltage ripple.

It will be appreciated by those skilled in the art that the above-described preferred embodiments may be freely combined and superimposed without conflict.

It will be understood that the embodiments described above are illustrative only and not restrictive, and that various obvious or equivalent modifications or substitutions that could be made by those skilled in the art with respect to the above details, without departing from the basic principles of the invention, which are within the claims of the invention.

What is claimed is:

1. A switching power supply, comprising a current-mode PWM control unit and a transformer, the current-mode PWM control unit comprising a current detection terminal used for detecting a current in a primary winding of the transformer thereby controlling a power transfer, wherein
the switching power supply further comprises a DC power supply circuit and a power compensation auxiliary circuit connected in series; an input of the DC power supply circuit is connected to an auxiliary voltage output which outputs an auxiliary voltage related to an output voltage of the switching power supply; an output of the power compensation auxiliary circuit is connected to the current detection terminal;
the power compensation auxiliary circuit is used to determine an output voltage of the DC power supply circuit, when the output voltage of the switching power supply is not greater than a threshold voltage, the power compensation auxiliary circuit generates a DC voltage, thereby providing a compensation voltage to the current detection terminal; when the output voltage of the switching power supply is greater than the threshold voltage, the power compensation auxiliary circuit does not generate the DC voltage, thereby not providing the compensation voltage to the current detection terminal;
wherein said threshold voltage is within an output voltage range of the switching power supply.

2. The switching power supply of claim 1, wherein the transformer further comprises a first auxiliary winding having a first auxiliary voltage output for generating a first auxiliary voltage related to the output voltage, and a second auxiliary winding having a second auxiliary voltage output for generating a second auxiliary voltage related to the output voltage; the first auxiliary voltage is less than the second auxiliary voltage;
the power compensation auxiliary circuit comprises a switch, a comparator and a voltage generation circuit, the DC power supply circuit comprises a first DC power supply circuit, a second DC power supply circuit, and a third DC power supply circuit; an input of the first DC power supply circuit is connected to the first auxiliary voltage output or to the second auxiliary voltage output; an output of the first DC power supply circuit, the switch, the voltage generation circuit and the current detection terminal are connected in series; an input of the third DC power supply circuit is connected to the first auxiliary voltage output and an output of the third DC power supply circuit is connected to a first input of the comparator; an input of the second DC power supply circuit is connected to the second auxiliary voltage output and an output of the second DC power supply circuit is connected to a second input of the comparator;
the comparator is used to compare an output voltage of the third DC power supply circuit with an output voltage of the second DC power supply circuit; when the output voltage of the switching power supply is not greater than the threshold voltage, the comparator outputs a control signal to control the switch to be on, and the voltage generation circuit generates an output voltage, thus providing the compensation voltage to the current detection terminal; when the output voltage of the switching power supply is greater than the threshold voltage, the comparator outputs a control signal to control the switch to be off, and the voltage generation circuit does not generate the DC voltage, thus not providing the compensation voltage to the current detection terminal.

3. The switching power supply of claim 1, wherein
the power compensation auxiliary circuit comprises a P-type semiconductor switch; the DC power supply circuit provides a second voltage and a first voltage to a current input terminal and a control terminal of the P-type semiconductor switch respectively; at least one of the second voltage and the first voltage is related to the current output voltage of the switching power supply;
when the output voltage of the switching power supply is not greater than the threshold voltage, the difference between the second voltage and the first voltage is greater than a breakover voltage between the current input terminal and the control terminal of the P-type semiconductor switch, the P-type semiconductor switch turns on, and the power compensation auxiliary circuit generates the DC voltage so as to provide the compensation voltage to the current detection terminal;
when the output voltage of the switching power supply is greater than the threshold voltage, the difference between the second voltage and the first voltage is less than the breakover voltage between the current input terminal and the control terminal of the P-type semiconductor switch, the P-type semiconductor switch turns off, and the power compensation auxiliary circuit does not generate the DC voltage thus does not provide the compensation voltage to the current detection terminal.

4. The switching power supply of claim 3, wherein the P-type semiconductor switch comprises a PNP triode or a P-channel field effect transistor;
the current input terminal and the control terminal of the PNP triode are its emitter and base respectively;
the current input terminal and the control terminal of the P-channel field effect transistor are its source and gate respectively.

5. The switching power supply of claim 4, wherein
the power compensation auxiliary circuit further comprises a resistor divider module; the resistor divider module comprises a first resistor and a second resistor;

the collector of the PNP triode is connected to the current detection terminal through the second resistor, and the current detection terminal is connected to a sampling resistor of the primary winding of the transformer through the first resistor;

when the PNP triode is turned on, the second voltage provides the compensation voltage to the current detection terminal by applying voltage across the first resistor and the second resistor.

6. The switching power supply of claim 3, wherein
the transformer further comprises a first auxiliary winding for generating a first auxiliary voltage related to the output voltage, and a second auxiliary winding for generating a second auxiliary voltage related to the output voltage, and the first auxiliary voltage is less than the second auxiliary voltage;
the DC power supply circuit comprises a first DC power supply circuit used for outputting the first voltage based on the first auxiliary voltage, and a second DC power supply circuit used for outputting the second voltage based on the second auxiliary voltage.

7. The switching power supply of claim 6, wherein
the second DC power supply circuit comprises a third resistor, an N-channel MOS (metal oxide semiconductor) transistor, a first voltage stabilizing diode and a capacitor; the first DC power supply circuit comprises a second voltage stabilizing diode;
the second auxiliary voltage is grounded through the third resistor and the first voltage stabilizing diode, and the anode of the first voltage stabilizing diode is grounded;
the drain, gate and source of the N-channel MOS transistor are respectively connected to the second auxiliary voltage, the cathode of the first voltage stabilizing diode and the emitter of the PNP triode, wherein the emitter of the PNP triode outputs the second voltage;
the first auxiliary voltage is connected to the base of the PNP triode through the second voltage stabilizing diode, and the anode of the second voltage stabilizing diode is connected to the first auxiliary voltage, and the voltage at the base of the PNP triode is the first voltage.

8. The switching power supply of claim 7, wherein
a stabilized voltage value of the second voltage stabilizing diode is determined based on the threshold voltage.

9. The switching power supply of claim 7, wherein
the switching power supply further comprises a third voltage stabilizing diode and a fourth voltage stabilizing diode;

the second voltage is connected to a power supply terminal of the PWM control unit through the third voltage stabilizing diode; the first auxiliary voltage is connected to the power supply terminal of the PWM control unit through the fourth voltage stabilizing diode; a cathode of the third voltage stabilizing diode and a cathode of the fourth voltage stabilizing diode are connected to the power supply terminal of the PWM control unit;

a stabilized voltage value of the first voltage stabilizing diode is determined by the power supply voltage range of the power supply terminal of the PWM control unit.

10. The switching power supply of claim 6, wherein
the second DC power supply circuit comprises a voltage stabilizing chip outputting the second voltage based on the second auxiliary voltage, wherein the second voltage is a set voltage value or a voltage value related to the second auxiliary voltage;
the first DC power supply circuit comprises a second voltage stabilizing diode;
the first auxiliary voltage is connected to the base of the PNP triode through the second voltage stabilizing diode, and the cathode of the second voltage stabilizing diode is connected to the base of the PNP triode, wherein the voltage at the base of the PNP triode is the first voltage.

11. The switching power supply of claim 10, wherein
a stabilized voltage value of the second voltage stabilizing diode is determined based on the threshold voltage.

12. The switching power supply of claim 3, wherein
the transformer further comprises an auxiliary winding for generating an auxiliary voltage related to the output voltage of the switching power supply;
the DC power supply circuit comprises a first DC power supply circuit used for outputting the first voltage based on the auxiliary voltage, and a second DC power supply circuit used for outputting the second voltage based on the auxiliary voltage.

13. The switching power supply of claim 1, wherein
the output voltage range of the switching power supply is 5-24V, or at least partially overlaps with the voltage range of 5-24V.

14. A power adapter, wherein the power adapter comprises the switching power supply of claim 1.

15. A power charger, wherein the power charger comprises the switching power supply of claim 1.

* * * * *